United States Patent [19]

Stevens

[11] 4,046,045
[45] Sept. 6, 1977

[54] WIRE SPLITTER FOR ROUND CONDUCTOR FLAT RIBBON CABLE

[75] Inventor: Charles H. Stevens, Costa Mesa, Calif.

[73] Assignee: International Telephone and Telegraph Corporation, New York, N.Y.

[21] Appl. No.: 752,007

[22] Filed: Dec. 20, 1976

[51] Int. Cl.² .......................... B26D 5/10; H02G 1/12
[52] U.S. Cl. ........................................ 83/620; 83/613; 83/618; 83/694; 83/925 R; 81/9.51
[58] Field of Search ................... 83/55, 620, 618, 613, 83/925 R, 698, 694; 81/951

[56] References Cited

U.S. PATENT DOCUMENTS

| 3,677,116 | 7/1972 | Berg et al. | 83/55 |
| 3,922,934 | 12/1975 | Hiatt | 81/9.51 |
| 3,988,815 | 11/1976 | Petree | 81/9.51 |

*Primary Examiner*—Donald R. Schran
*Attorney, Agent, or Firm*—Thomas L. Peterson

[57] ABSTRACT

A device for preparing a flat multi-conductor ribbon cable, having a plurality of conductors of circular cross section, for termination into a flat cable connector. A pair of meshing cutters, at least one of which is movable, are engaged with the ribbon cable between them. The cutters shear the cable webs, joining the individual conductor insulating jackets for a predetermined lengthwise distance along the flat cable, the individual blades of the cutter being configured to shear webs between adjacent conductors or alternatively between the web separating groups of a predetermined number of conductors. Each blade of each cutter has at least one concave depression engaging the individual round conductors to stabilize them during the shearing operation. At least one of the meshing cutters has a convex curvature in a plane parallel to the lengthwise dimension of the ribbon cable to minimize the required shearing force and hazard of cable damage.

7 Claims, 9 Drawing Figures

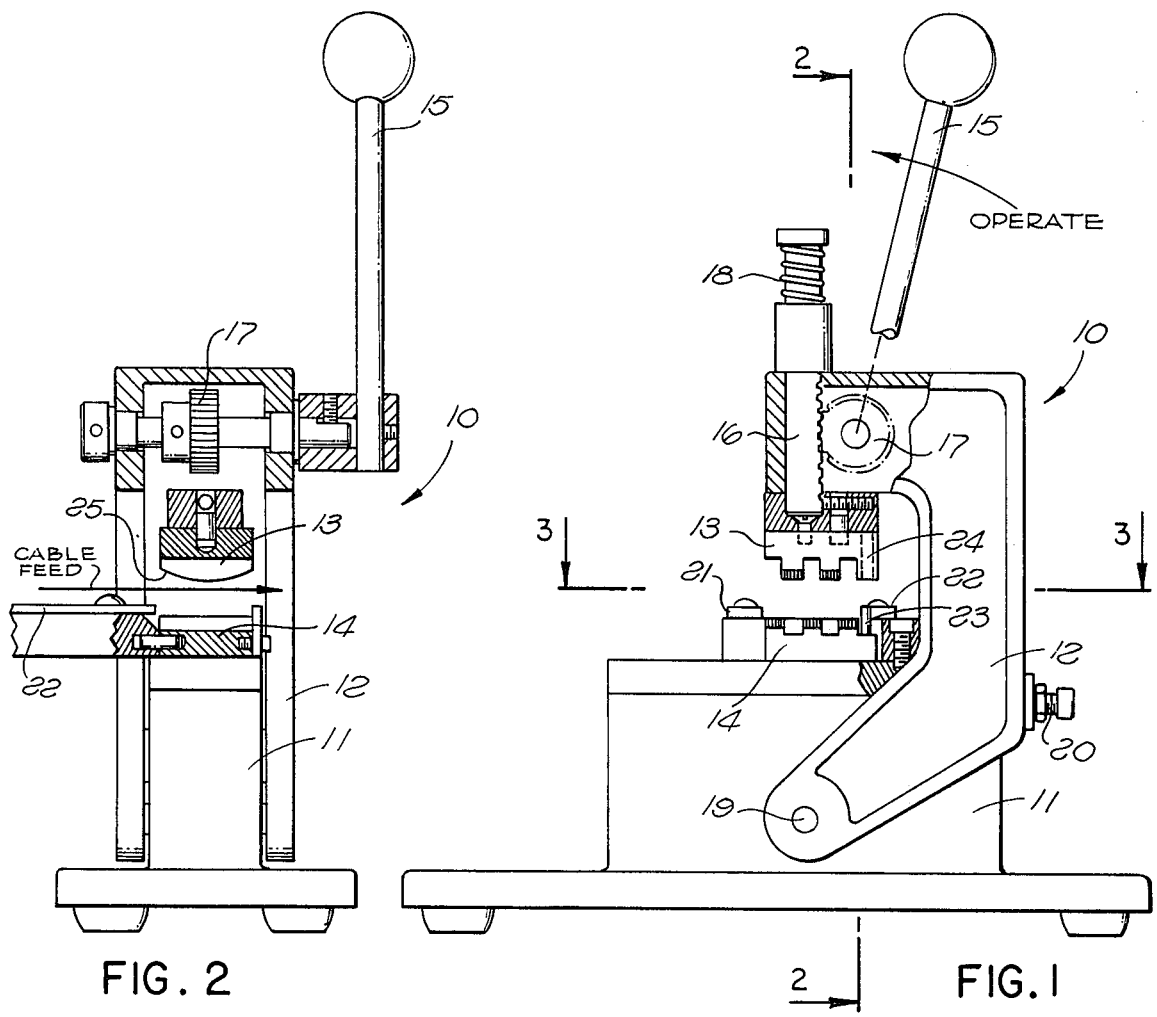
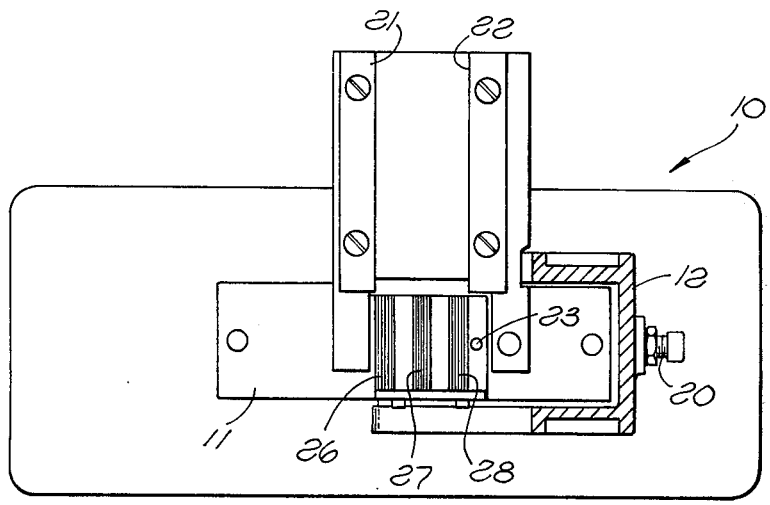

WIRE SPLITTER FOR ROUND CONDUCTOR FLAT RIBBON CABLE

BACKGROUND OF THE INVENTION

1. Field of the Invention

The invention relates to tooling for the preparation of round-conductor flat ribbon cables for subsequent termination (insertion) into electrical connectors. More particularly, the invention relates to an improved splitter for shearing the insulation web between the insulating jackets of adjacent conductors or groups of conductors in a flat ribbon cable.

2. Description of the Prior Art

In the prior art, and especially in the recent prior art, there have been various approaches taken to the problem of reducing the labor involved and therefore the cost of wiring and cabling of complex electrical and electronic equipment. That equipment nearly always comprises a number of subassemblies or plug-in modules which are interconnected with the other electrical subassemblies of a system. Such devices as computer systems involved large numbers of conductors running among the subassemblies or modules of the system, and removable electrical connections affecting large numbers of conductors must be provided.

The recent developments aforementioned include various forms of solderless connectors whereby a multiconductor cable may be terminated in a connector much more quickly and with far fewer manufacturing operations than had previously been the case. A connector of the general type is referred to and described in U.S. Pat. No. 3,955,873. In that connector, the terminating posts or terminals are uniquely shaped as individual bifurcated elements into which insulated conductors can be discretely inserted. The slot formed by the bifurcated configuration is tapered and appropriately shaped along its inside edges so that in the proceess of inserting an insulated conductor therein for termination, the insulation is pierced (cut through) and a reliable electrical contact made. In lieu of individual wire connections, tooling, which may be a part of the assembled connector itself, can effect simultaneous termination of all of the conductors of a given cable, each conductor being terminated into a discrete predetermined bifurcated terminal post. The other extremes of each of the bifurcated terminals extend oppositely and provide the individual pins along the mating interface of the connector.

In U.S. patent application Ser. No. 664,487, entitled *Electrical Connector*, filed Mar. 8, 1976, an improved form of the connector of prior U.S. Pat. No. 3,955,873 is described. Among the improvements therein is the introduction of staggering of the aforementioned bifurcated terminals. That is, in a two-row pin arrangement, a pin-to-pin spacing in each row being aligned with the space between pins in the other row. Such a configuration is better adapted to the termination of flat ribbon-type cables, in that the insertion or termination of the conductors of the ribbon cable is facilitated. This is because alternate conductors pass between the terminals of the first row encountered to be terminated in a second row of terminals.

The solderless cable termination concept hereinabove described may otherwise be referred to as the "insulation displacement" technique and is particularly adapted to round-conductor, flat, ribbon cable. In such cables, the conductors are individually insulated, i.e., each has its own insulating jacket, and all of the connectors of the ribbon are joined in flat juxtaposition by webs, usually integral with the conductor insulation.

A frequently encountered problem arises from the fact that the center distances between contracts of the connectors hereinabove described is different from the center-to-center distances of the conductors of commercially available ribbon cables. For example, common commercially available connectors of the type described employ contact center-to-center spacing of 0.054 inches whereas the commonly available ribbon cable is fabricated with its conductor center-to-center spacing on the order of 0.050 inches.

It has been recognized that to terminate the conductors of the ribbon cable having 0.050 centers in the 0.054 centers connector contacts, the round conductors of such a flat ribbon cable must be split apart and dressed to the area directly above the individual contacts on the wider centers of the connector. That is, the web of insulating material joining the adjacent conductors or groups of conductors must be split for a predetermined distance along the length dimension of a ribbon cable to effectively "fan out" the conductors to the wider centers of the connector. Devices are known which comprise a series of facing cutters each having alternate blades basically of flat shape along the cutting edges running in the longitudinal cable dimension. These cutters are advanced against each other with a ribbon cable place between them. Such devices tend to alternately raise and lower the individual conductors or groups of conductors differentially causing a shearing action between them, thereby splitting the ribbon cable. Such devices are mounted on high leverage press-type equipment to accommodate the relatively heavy loads involved in this splitting operation.

It has been found that, due to the flat configuration of the individual blades of such devices, excessive loads are involved or excessive force is required to perform the splitting, particularly if a cable width of more than approximately ¾ inches measured transversely is to be simultaneously split on a common 25 conductor ribbon cable. The excessive force required also has been found to cause damage and skewing of the individual wires and tearing of the individual jackets. The edges of the individual blades of the cutters are sharpened, but tearing action outside but adjacent to the axial or length dimension of the splitting desired (length of blades) is inevitable.

The manner in which the present invention reduces the operating forces required and greatly improves the quality of web-splitting in ribbon cable to be prepared for termination will be understood as this description proceeds.

SUMMARY

In the combination of the invention, a pair of opposite facing cutters or cutter combs of alternate blades are provided such that, when at least one is advanced toward the other, an interleaving effect occurs. The cable having been placed therebetween, a shearing action results between adjacent insulated conductor jackets or groups of these jacets, as predetermined. Each of the alternate blades includes at least one (or a plurality if the shearing is to be done in groups) of concave scallops or concavities which fit over the individual conductor jackets during the shearing operation. In the orthogonal plane, i.e., in a plane parallel to the longitudinal or lengthwise dimension of the ribbon cable, each of the cutters in at least one of the (upper or lower)

cutter assemblies is generally convex in shape. In this way, the shearing action is progressive in that dimension. Both the upper and lower blade assemblies may be curved in this plane, although progressive shearing action can be achieved with only one of them so contoured. The details of a typical embodiment with certain variations will be understood as this description proceeds.

BRIEF DESCRIPTION OF THE DRAWINGS

FIG. 1 depicts in partially sectional form upper and lower cutters each with several groups of blades according to the invention, installed in an arbor-press arrangement.

FIG. 2 is an end-on view, also partially sectional, from the operator's position of the device of FIG. 1.

FIG. 3 is a partial sectional view taken as indicated on FIG. 1.

DESCRIPTION OF THE PREFERRED EMBODIMENTS

Figure 4:
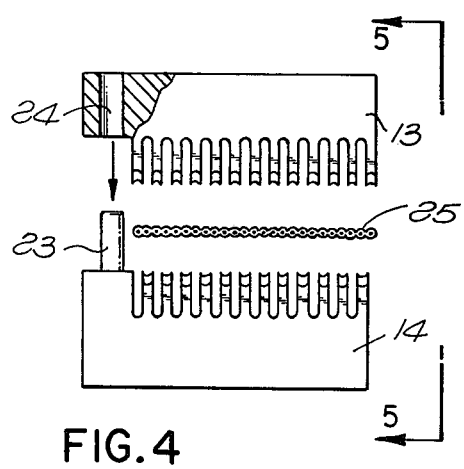
FIG. 4 is an end-on view of a pair of cutters, each with multiple interleaving blades adapted for shearing between individual conductors.

Referring now to FIG. 1, a side view of a substantially complete device according to the invention is illustrated generally at 10. In order to provide the mechanical forces necessary for operation, the cutters of the invention are installed opposite facing in an arbon press comprising a base 11 and a pivotably upper support structure 12. FIG. 1 is partially sectioned for clarity, the upper cutter member 13 being advanceable against a lower cutter 14 as an operator advances the lever 15. The cutters each comprise a plurality of blades, each blade having a width substantially equal to the diameter of one insulated conductor of the ribbon cable.

Rack and pinion members 16 and 17, respectively, operate in a manner well understood in such devices. The spring arrangement 18 provides for return of the lever 15, rack 16 and upper cutter 13 to the position illustrated after each cutting action. The support structure 12 is capable of being pivoted about the fulcrum 19 when the mounting bolt arrangement 20 is withdrawn or otherwise released. This facilitates removal or implacement of cutters such as 13 and 14.

The ribbon cable to be prepared by shearing in the device if FIG. 1 is passed between the stops 21 and 22 perpendicular to the plane of the sheet. As in common in punches and presses, a guide pin and socket arrangement 23 and 24 are provided to ensure alignment of the interleaving upper and lower cutter parts, since relatively close tolerances are involved as sharpened shearing edges of the interleaving blades pass each other.

FIG. 2 is an end-on view of the device of FIG. 1, partially sectioned and somewhat simplified for clarity. It will be noted that the upper cutter 13 is contoured, as shown, however the lower cutter 14 is illustrated as having a flat top projection. As the cable is fed through (from left to right as shown in FIG. 2) and as the cutter 13 is advanced downward, a progressive shearing action occurs in the web or webs of the cable as already hereinbefore described. This cutting action may be thought of as progressive, i.e., theoretically starting at a point where the curve 25 of the cutter 13 is just tangent to the top surface of the cable lying over the cutter 14, and advancing in opposite directions. Accordingly, there is no substantial longitudinal force on the cable, the reactions to the cutting edge advancement being equal and opposite.

Figure 6:
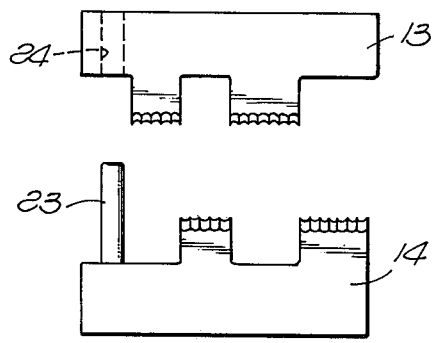
FIG. 6 is an alternate form of cutter basically similar to FIG. 4, except providing for group shearing of the ribbon cable conductors.

FIG. 3 illustrates essentially a top view taken by sectioning from FIG. 1 as indicated. The cable guides or stops 21 and 22 are more clearly evident from FIG. 3, and three blades 26, 27 and 28 of the cutter 14, as illustrated in FIG. 1, are depicted. Thus, the blades 26, 27 and 28 form the lower cutter in the configuration in which the cable web is split or sliced between adjoining sections of cable conductors in some predetermined number of conductors per section. In FIGS. 1 and 2, the number of cable conductors per section is depicted as a small number such as four or five for each section. Looking ahead to FIG. 6, it will be seen that the number of conductors per section need not be the same and can be varied in accordance with the requirements of a particular job.

Figure 7:
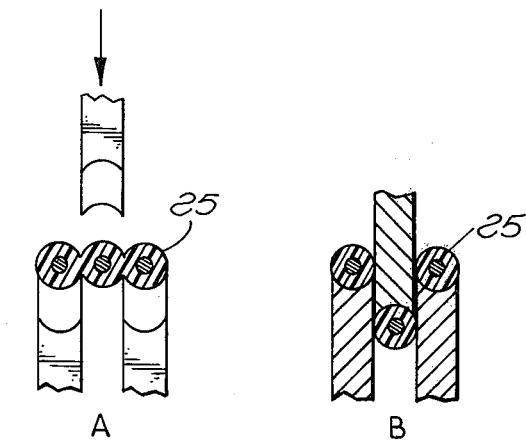
FIGS. 7A and 7B illustrate the shearing action before and after operation, respectively, which might be expected of the blade configuration of FIG. 4.

FIG. 4, on the other hand, illustrates an embodiment of the cutters in which the individual blades are one cable conductor wide, the cable 25 being represented end-on. The cutting action afforded by the cutter configuration of FIG. 4 is illustrated in FIG. 7A and 7B (before and immediately after shearing, respectively). The results of this type of shearing might produce a prepared cable resembling FIG. 8, whereas the cutters of FIG. 6 would produce a prepared cable resembling FIG. 9.

Figure 5:
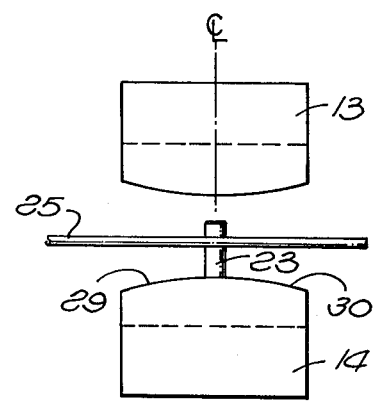
FIG. 5 is a side view of FIGS. 4 or 6 illustrating the contouring of both upper and lower cutting blades.

As has been previously indicated, the upper and lower cutters 13 and 14 may both be (and preferably are) contoured, as shown in FIG. 5. The view of FIG. 5 might be thought of as the 90-degree projection around to the right of either FIG. 4 or FIG. 6.

Figure 8:
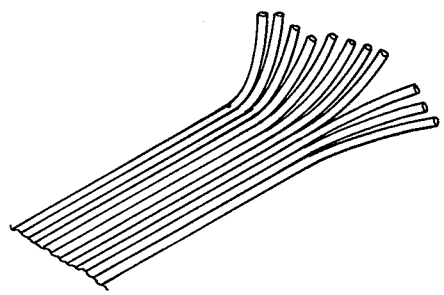
FIG. 8 illustrates a ribbon cable prepared for connector termination after shearing by a cutter arrangement of FIG. 4 in the device of FIG. 1.
Figure 9:
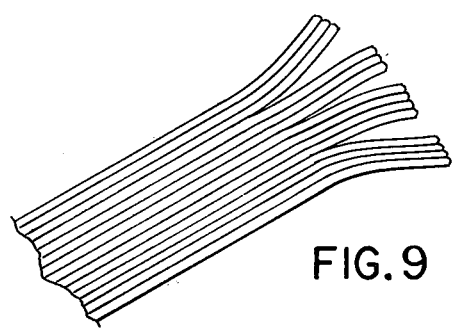
FIG. 9 illustrates a cable in which the conductors have been sheared in groups in a manner which might be expected using a cutter pair of the type shown in FIG. 6.

The cables as prepared and illustrated in FIGS. 8 and 9 may be thought of as ready for installation or termination into a connector of the type hereinbefore described, using specific tooling for the purpose. This preparation greatly relieves the problem of maintaining alignment of conductors versus bifurcated pins in the connector.

In referring to the cutter shapes in the plane illustrated in FIG. 5 and FIG. 2, the term, convex, is intended to include the general shapes of FIG. 5 with more or less curvature and also any logical variation thereof. For example, along the center line, as illustrated in FIG. 5, one or both of the cutters 13 and 14 might be shaped to a point. From there, the slopes of the cutters, for example 29 and 30, might acutally be straight. The operation of such a cutter configuration would be such as to provide the same type of progressive cutting or splitting as would be provided through use of the curvatures of FIG. 5 or, for that matter, FIG. 2.

Other variations and modifications in the structure illustrated and described will suggest themselves to those skilled in this art. Accordingly, it is not intended that the drawings and this description should be regarded as limiting the scope of the invention. The drawings and this description are to be regarded as typical and illustrative only.

I claim:

1. A device for preparing a flat multi-conductor ribbon cable having a plurality of individually insulated conductors of circular cross section for termination into a flat cable connector, said cable having webs between the insulation coverings of each of the individual conductors, by selective splitting said webs between groups of at least one adjacent conductor per group, said splitting being effected over a first predetermined dimension along the length of said cable, comprising:

first means comprising upper and lower meshing cutter blades each containing a plurality of spaced cutter sections, each of said sections having a number of adjacent troughs of concave cross section equal to the number of said conductors in the corresponding one of said groups, said troughs being elongated in the length dimension of said flat cable, and each of said cutter sections having cutting edges at the lines of meshing with the adjacent sections of the other of said cutters to shear said webs between said groups of conductors;

second means comprising means for supporting said cutter blades and for imparting motion to at least one of said blades, said sections of each of said cutters producing a shearing action by meshing within the spaces between adjacent cutter sections of the other cutter;

and third means comprising a convex-shape extant on the surface of at one of said cutter blades facing the other of said blades, said convex shape corresponding to a curve in a plane parallel to said troughs, thereby to provide two progressing points of shear from a central point in the direction of said cable length, one progressing to one end of said convex shaped cutter blade and the other to the other end thereof.

2. Apparatus according to claim 1 in which said lower blade is supported in a stationary position by said second means and said second means operates to move said upper blade toward said lower blade against said flat cable to effect said shearing action.

3. Apparatus according to claim 1 in which both said upper and lower blades have said convex shape curved in the same direction.

4. Apparatus according to claim 3 in which all of said sections of both said upper and lower blades have said convex shape curved in the same direction.

5. Apparatus according to claim 1 in which said cutter section each include a plurality of said concave troughs and said groups of conductors each comprise a like plurality of said conductors.

6. Apparatus according to claim 4 in which said cutter section each include a plurality of said concave troughs and said groups of conductors each comprise a like plurality of said conductors.

7. Apparatus according to claim 1 in which said elongated troughs have a concave shape substantially matching the outside convex shape of said individual conductors of said flat ribbon cable, thereby to align said cable transversely to permit said shearing action to split said webs without damage to the insulation of said conductors.

* * * * *